United States Patent
Coleman et al.

(10) Patent No.: US 6,418,721 B1
(45) Date of Patent: *Jul. 16, 2002

(54) TWO TURBOCHARGER EXHAUST GAS RE-CIRCULATION SYSTEM HAVING A FIRST STAGE VARIABLE NOZZLE TURBINE

(75) Inventors: Gerald N. Coleman, Peoria; James J. Faletti, Spring Valley; Dennis D. Feucht, Morton; David A. Pierpont, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/755,632

(22) Filed: Jan. 5, 2001

(51) Int. Cl.[7] .............................................. F02B 33/44
(52) U.S. Cl. ....................................... 60/605.1; 60/612
(58) Field of Search ................................ 60/605.1, 605.2, 60/612

(56) References Cited

U.S. PATENT DOCUMENTS

| | | | |
|---|---|---|---|
| 3,250,068 A | | 5/1966 | Vulliamy |
| 4,299,090 A | * | 11/1981 | Deutschmann ............... 60/612 |
| 5,904,045 A | * | 5/1999 | Kapich ...................... 60/612 X |
| 6,062,026 A | * | 5/2000 | Woollenweber et al. ... 60/612 X |
| 6,112,523 A | * | 9/2000 | Kamo et al. ................... 60/612 |
| 6,164,071 A | * | 12/2000 | Shao et al. ................ 60/605.2 |

* cited by examiner

Primary Examiner—Hoang Nguyen
(74) Attorney, Agent, or Firm—Taylor & Aust. P.C.

(57) ABSTRACT

An internal combustion engine, particularly suitable for a motor vehicle, is provided with a plurality of combustion cylinders, at least a first exhaust manifold and a second exhaust manifold and at least one intake manifold. Each exhaust manifold is coupled with a plurality of the combustion cylinders. Each intake manifold is coupled with a plurality of the combustion cylinders. A first turbocharger includes a first turbine having at least one inlet and an outlet, and a first compressor having an inlet and an outlet. The at least one first turbine inlet is fluidly coupled with the first exhaust manifold and includes a controllable, variable intake nozzle. A second turbocharger includes a second turbine having an inlet and an outlet, and a second compressor having an inlet and an outlet. The second turbine inlet is fluidly coupled with the second exhaust manifold. The first compressor outlet is fluidly coupled with the second compressor inlet. The engine has improved performance and efficiency, with an efficient and compact turbocharger arrangement.

22 Claims, 1 Drawing Sheet

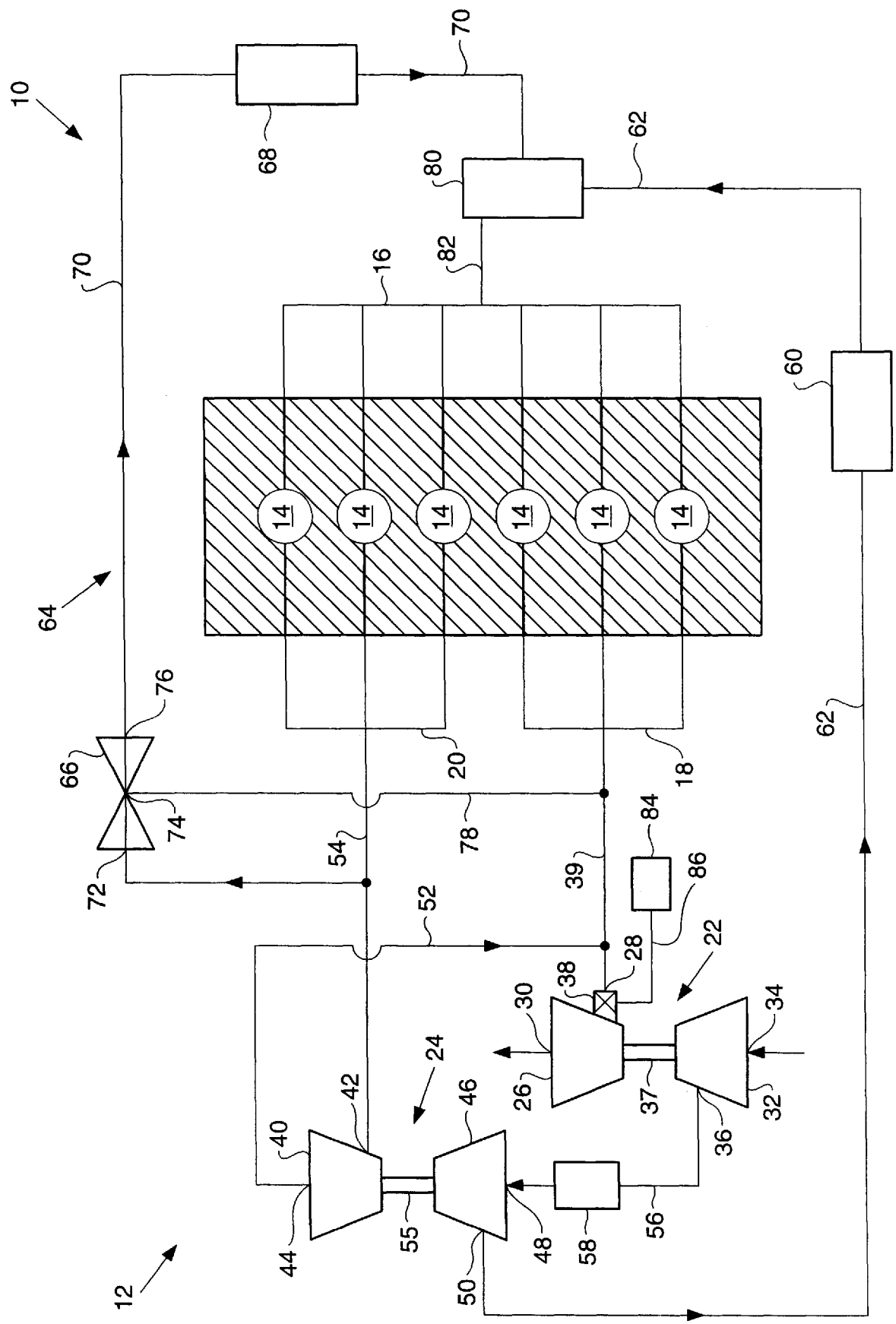

TWO TURBOCHARGER EXHAUST GAS RE-CIRCULATION SYSTEM HAVING A FIRST STAGE VARIABLE NOZZLE TURBINE

TECHNICAL FIELD

The present invention relates to internal combustion engine turbochargers and exhaust gas re-circulation systems, and, more particularly, to an internal combustion engine having multiple exhaust gas manifolds, a two turbocharger and an exhaust gas re-circulation system.

BACKGROUND ART

An internal combustion engine may include one or more turbochargers for compressing a fluid to be supplied to one or more combustion chambers within corresponding combustion cylinders. Each turbocharger typically includes a turbine driven by exhaust gases of the engine, and a compressor driven by the turbine. The compressor receives the fluid to be compressed and supplies the compressed fluid to the combustion chambers. The fluid compressed by the compressor may be in the form of combustion air only, or may be a mixture of fuel and combustion air.

It is known to provide multiple turbochargers within a turbocharger system in an internal combustion engine. For example, U.S. Pat. No. 3,250,068 (Vulliamy) discloses an internal combustion engine having two turbochargers. A first turbocharger includes a turbine which is driven by a single exhaust manifold on the internal combustion engine. The spent exhaust gas from the turbine of the first turbocharger is transported in a series manner to the inlet of a turbine of the second turbocharger. The spent exhaust gas is then discharged to the ambient environment from the turbine of the second turbocharger. The compressor of the second turbocharger compresses ambient combustion air and provides the compressed combustion air in a series manner to the compressor of the first turbocharger, which in turn transports the compressed combustion air to the intake manifold of the engine.

A problem with a turbocharger system as described above is that the spent exhaust gas from the turbine of the first turbocharger may not have enough energy to provide a desired compression ratio within the second turbocharger. The overall compression ratio from the turbocharger system is thus limited according to the amount of energy available at the turbine of the second turbocharger.

An exhaust gas re-circulation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily re-circulate the exhaust gas by-products into the intake air supply of the internal combustion engine. The exhaust gas which is reintroduced to the engine cylinder reduces the concentration of oxygen therein, which in turn lowers the maximum combustion temperature within the cylinder, and slows the chemical reaction of the combustion process, decreasing the formation of nitrous oxides (NOx). Furthermore, the exhaust gases typically contain unburned hydrocarbons, which are burned on reintroduction into the engine cylinder, further reducing the amount of exhaust gas by-products emitted as undesirable pollutants from the internal combustion engine.

Dependent upon certain operating conditions associated with a diesel engine, it may be desirable to provide a richer or leaner mixture of the exhaust gas within the combustion air which is transported to the intake manifold. One known technique for controlling the amount of exhaust gas which is mixed with the combustion air utilizes controllably actuatable valves which interconnect the exhaust manifold with the compressor which receives the exhaust gas. The flow of exhaust gas to the second compressor can be completely shut off, or can be controlled on a timed basis to provide a desired average flow of exhaust gas which mixes with the combustion air. Another known technique is to provide a bypass fluid conduit associated with the combustion air or exhaust gas. A controllably actuatable butterfly valve or the like is positioned within the bypass fluid conduit and controlled to in turn control the amount of exhaust gas which mixes with the combustion air. Although such systems are effective to control exhaust gas re-circulation within the diesel engine, they usually require that additional structure in the form of sensors, conduits, valves and associated controllers be added to the internal combustion engine.

The present invention is directed to overcoming one or more of the problems as set forth above.

DISCLOSURE OF THE INVENTION

In one aspect of the invention, an internal combustion engine is provided with a plurality of combustion cylinders, and a first exhaust manifold and a second exhaust manifold each coupled with a plurality of combustion cylinders. At least one intake manifold is provided, coupled with a plurality of the combustion cylinders. A first turbocharger includes a first turbine having an inlet and an outlet, and a first compressor having an inlet and an outlet. The first turbine inlet has a controllable variable intake nozzle, and is fluidly coupled with the first exhaust manifold. A second turbocharger includes a second turbine having an inlet and an outlet, and a second compressor having an inlet and an outlet. The second turbine inlet is fluidly coupled with the second exhaust manifold. The second compressor inlet is fluidly coupled with the first compressor outlet.

In another aspect of the present invention, a turbocharger system is provided, for use with an internal combustion engine having a plurality of combustion cylinders, an intake manifold and first and second exhaust manifolds. The turbocharger system has a first turbocharger including a first turbine having at least one inlet and an outlet, and a first compressor having an inlet and an outlet. The at least one first turbine inlet has a controllable, variable intake nozzle, and is fluidly coupled with the first exhaust manifold. A second turbocharger includes a second turbine having an inlet and an outlet, and a second compressor having an inlet and an outlet. The second turbine inlet is fluidly coupled with the second exhaust manifold, and the second compressor inlet is fluidly coupled with the first compressor outlet.

In yet another aspect of the invention, a method of operating an internal combustion engine is provided having steps of providing a plurality of combustion cylinders and an intake manifold supplying combustion gas to the plurality of combustion cylinders; transporting exhaust gas from the plurality of combustion cylinders to at least a first exhaust manifold and a second exhaust manifold; providing a first turbocharger including a first turbine having at least one first turbine inlet with a controllable variable intake nozzle and having an outlet, and a first compressor having an inlet and an outlet; providing a second turbocharger including a second turbine having an inlet and an outlet, and a second compressor having an inlet and an outlet; rotatably driving the first turbine with exhaust gas introduced at the at least one first turbine inlet from the first exhaust manifold;

rotatably driving the second turbine with exhaust gas introduced at the second turbine inlet from the second exhaust manifold; introducing combustion gas at the first compressor inlet; transporting combustion gas from the first compressor outlet to the second compressor inlet; transporting combustion gas from the second compressor outlet to the intake manifold; sensing at least one of operating conditions of the engine and performance of the turbochargers; and controlling the controllable, variable intake nozzle in response to at least one of the engine operating conditions and the performance of the turbochargers.

In still another aspect of the present invention, a turbocharger and engine emission control system is provided for use with an internal combustion engine having a plurality of combustion cylinders, an intake manifold and first and second exhaust manifolds. A first turbocharger includes a first turbine having an inlet and an outlet, and a first compressor having an inlet and an outlet. The first turbine inlet has a controllable variable intake nozzle, and is fluidly coupled with the first exhaust manifold. A second turbocharger includes a second turbine having a fixed inlet and an outlet, and a second compressor having an inlet and an outlet. The second turbine inlet is fluidly coupled with the second exhaust manifold. The second compressor inlet is fluidly coupled with the first compressor outlet, and the second compressor outlet is fluidly coupled with the intake manifold. An exhaust gas re-circulation duct is fluidly coupled to the second exhaust manifold and the intake manifold.

BRIEF DESCRIPTION OF THE DRAWING

The sole drawing, FIG. 1, is a schematic representation of an internal combustion engine, including a turbocharger and exhaust gas re-circulation system of the present invention.

BEST MODE FOR CARRYING OUT THE INVENTION

Referring now to the drawing, there is shown an embodiment of an internal combustion engine 10 including a turbocharger system 12 of the present invention.

Internal combustion engine 10 includes a plurality of combustion cylinders 14, such as the six combustion cylinders 14 shown in the drawing, each of which is coupled with a corresponding intake manifold 16 and exhaust manifold 18, 20. Internal combustion engine 10 includes one or more intake manifolds 16, and in the embodiment shown in the drawing includes a single intake manifold 16 which is fluidly coupled with each combustion cylinder 14, and provides a combustion gas mixture to each combustion cylinder 14, as will be described hereinafter. Internal combustion engine 10 also includes one or more exhaust manifolds 18, 20, and in the embodiment shown includes a first exhaust manifold 18 and a second exhaust manifold 20. First exhaust manifold 18 is fluidly coupled with three combustion cylinders 14, and second exhaust manifold 20 is fluidly coupled with the remaining three combustion cylinders 14. A fuel, such as diesel fuel, is injected into each combustion cylinder 14 and combusted therein, in known manner.

Turbocharger system 12 includes a first turbocharger 22 and a second turbocharger 24. First turbocharger 22 includes a first turbine 26 having at least one first turbine inlet 28 and an outlet 30, and a first compressor 32 having an inlet 34 and an outlet 36. First turbine 26 may be provided as a divided housing turbine having multiple inlets. Inlet 28 includes a controllably actuatable variable intake nozzle 38 at inlet 28, with a constriction nozzle which may be controllably adjusted to thereby provide an inlet orifice to first turbine 26 with a varying area. By varying the area of intake nozzle 38, the flow rate through first turbine 26 is controlled, which in turn controls the rotational output speed of first turbine 26.

First turbine 26 is mechanically coupled with first compressor 32, such as by a shaft 37, and thereby rotatably drives first compressor 32. First turbine inlet 28 is fluidly coupled with exhaust manifold 18 via a fluid conduit 39, and receives exhaust gas therefrom for rotatably driving first turbine 26. The exhaust gas which passes through and exits from first turbine 26 flows to the engine exhaust gas system, including any muffler (not shown), and is eventually discharged to the ambient environment. First compressor inlet 34 receives combustion air from the ambient environment, for compressing within first compressor 32.

Second turbocharger 24 includes a second turbine 40 having an inlet 42 and an outlet 44, and a second compressor 46 having an inlet 48 and an outlet 50. Unlike first turbine inlet 28, which includes variable intake nozzle 38, second turbine 40 is a fixed housing turbine, including inlet 42 having a fixed inlet geometry. Second turbine outlet 44 is fluidly coupled with first turbine inlet 28 via a fluid conduit 52 fluidly interconnecting outlet 44 with fluid conduit 39. It should be understood that, if first turbine 26 is provided as a divided housing turbine, with a second first turbine inlet (not shown), fluid conduit 52 may be connected to the second first turbine inlet. Inlet 42 of second turbine 40 is fluidly coupled with second exhaust manifold 20 via a fluid conduit 54.

Second compressor 46 is mechanically coupled with and rotatably driven by second turbine 40, such as through a shaft 55. Second compressor inlet 48 is fluidly coupled with first compressor outlet 36 via a fluid conduit 56. An optional intercooler 58 is disposed in fluid communication with fluid conduit 56, for cooling compressed combustion gas transported from first compressor 32 to second compressor 46. An aftercooler 60 is disposed in fluid communication with a fluid conduit 62, which fluidly couples second compressor 46 outlet 50 with intake manifold 16.

An EGR system 64 fluidly interconnects second exhaust manifold 20 with intake manifold 16. A valve 66 and cooler 68 are positioned in fluid communication with an EGR duct 70. Valve 66 controls a flow of exhaust gas re-circulated from exhaust manifold 20 to intake manifold 16. Cooler 68 acts as a heat exchanger, to cool the exhaust gas re-circulated to intake manifold 16.

Valve 66 includes an inlet 72, a first outlet 74 and a second outlet 76. Inlet 72 is fluidly coupled with second exhaust manifold 20 via EGR duct 70. Valve first outlet 74 is fluidly coupled with first turbine inlet 28 and fluid conduit 39 via a fluid conduit 78. Valve second outlet 76 is fluidly coupled with intake manifold 16 via EGR duct 70. Again, in the case of a divided housing first turbine 26, fluid conduit 78 may be fluidly coupled directly or indirectly with a second first turbine inlet (not shown).

A mixer 80 receives exhaust gas flow from EGR duct 70 and compressed combustion fluid flow from fluid conduit 62, and supplies a mixture thereof to intake manifold 16 via a fluid conduit 82.

A controller 84 is coupled to and receives input data from engine and turbocharger operating and performance sensors (not shown), and transmits control signals via a signal line 86 to variable intake nozzle 38, for controlling and adjusting the area thereof. The controller 84 is also coupled to and receives input data from the engine to control the position of the valve 66.

INDUSTRIAL APPLICABILITY

During use of engine 10, turbocharger system 12 and EGR system 64, fuel, such as diesel fuel is injected into combustion cylinders 14 and combusted when a piston (not shown) disposed within each combustion cylinder 14 is at or near a top dead center (TDC) position. Exhaust gas is transported from each combustion cylinder 14 to the exhaust manifold associated with it, either first exhaust manifold 18 or second exhaust manifold 20. Exhaust gas within first exhaust manifold 18 is transported to first turbine 26 via fluid conduit 39, for rotatably driving first turbine 26. First turbine 26 in turn rotatably drives first compressor 32 via shaft 37.

In response to data on engine operating conditions, or data on performance of the turbochargers received by controller 84, the controllable variable intake nozzle 38 at inlet 28 is adjusted. For example, a sensor or sensors, not shown, may sense engine load condition, engine coolant temperature, combustion air inlet temperature or an engine start-up condition, as well as various performance data obtained from first turbocharger 22 and second turbocharger 24, which is transmitted to and processed by controller 84. By varying the area of the variable intake nozzle 38, the flow rate through first turbine 26 is controlled, which in turn controls the rotational output speed of first turbine 26 and shaft 37, and therefore the rotational speed and performance of first compressor 32.

Concurrently, exhaust gas from exhaust manifold 20 is transported to second turbine inlet 42 via fluid conduit 54 for driving second turbine 40. Second turbine 40 in turn rotatably drives second compressor 46 via shaft 55. The spent exhaust gas from second turbine 40 flows from second turbine outlet 44 through fluid conduit 52 to fluid conduit 39 for rotatably driving first turbine 26. The spent exhaust gas is discharged from first turbine 26 outlet 30 to the engine 10 exhaust system and then to the ambient environment.

First compressor 32 draws combustion air into first compressor inlet 34. The combustion air is compressed within first compressor 32, and is discharged from first compressor 32 outlet 36 through fluid conduit 56. The compressed combustion air is optionally cooled within intercooler 58, and is transported to second compressor inlet 48 for further compressing within second compressor 46. First compressor 32 and second compressor 46 thus form a multi-stage compressor for compressing combustion air which is provided to intake manifold 16.

The compressed combustion air is transported from second compressor 46 outlet 50 through fluid conduit 62 to aftercooler 60. The compressed combustion air is again cooled within aftercooler 60, and is transported to intake manifold 16 via mixer 80 and fluid conduit 82, for use in combustion occurring within combustion cylinders 14.

Exhaust gas is re-circulated from second exhaust manifold 20 to intake manifold 16 via EGR duct 70, mixer 80 and fluid conduit 82. Valve 66 is controlled and selectively actuated via suitable electrical circuitry (not shown) to control the amount of exhaust gas which is re-circulated to intake manifold 16. Exhaust gas flowing from first outlet 74 of valve 66 flows through fluid conduit 78, and mixes with exhaust gas from first exhaust manifold 18, flowing to first turbine 26 inlet 28 via fluid conduit 39 and variable intake nozzle 38. Exhaust gas from valve 66 second outlet 76 is cooled within EGR cooler 68 and is then transported to mixer 80, for mixing with the combustion air compressed by first compressor 32 and second compressor 46, and cooled by the optional interstage cooler 58 and aftercooler 60. The mixture of combustion air and exhaust gas is then transported to intake manifold 16 via fluid conduit 82.

Valve 66 functions both to regulate the flow of exhaust gas that is mixed with the combustion air transported to intake manifold 16, and to provide exhaust gas to first turbocharger 22. Controlling or regulating the amount of exhaust gas transported to intake manifold 16 provides an effective exhaust gas re-circulation system within internal combustion engine 10. Moreover, controlling a flow of exhaust gas to first turbine 26 utilizes energy from the exhaust gas not transported to intake manifold 16 to drive first turbine 26.

EGR valve 66 controls the flow rate of exhaust gases to intake manifold 16. Second stage fixed turbine 46 establishes a differential pressure between each of the first exhaust manifold 18 and second exhaust manifold 20 and the intake manifold 16 sufficiently high to force exhaust flow into intake manifold 16. Variable nozzle 38 at inlet 28 of first turbine 26 can be controlled to improve engine load acceptance and engine braking by controlling the performance of first turbine 26, and thus the performance of first compressor 32.

The turbocharger system of the present invention provides multiple turbochargers with turbines and compressors fluidly coupled together in a series arrangement to provide improved performance and efficiency. The first turbocharger has a turbine that receives exhaust gas from both an exhaust manifold and from the turbine of the second turbocharger. By utilizing the spent exhaust gas from the second turbocharger, the energy associated therewith may be recaptured, along with the energy from the first exhaust manifold, and utilized to drive the turbine of the first turbocharger. The turbocharger system is compact, efficient and provides compressed air with a relatively high compression ratio to the intake manifold.

Other aspects, objects and advantages of this invention can be obtained from a study of the drawing, the disclosure and the appended claims.

What is claimed is:

1. An internal combustion engine, comprising:
   a plurality of combustion cylinders;
   a first exhaust manifold and a second exhaust manifold, each said first exhaust manifold and said second exhaust manifold coupled with a plurality of said combustion cylinders;
   at least one intake manifold, each said intake manifold coupled with a plurality of said combustion cylinders;
   a first turbocharger including a first turbine having an inlet and an outlet, and a first compressor having an inlet and an outlet, said first turbine inlet having a controllable, variable intake nozzle and being fluidly coupled with said first exhaust manifold; and
   a second turbocharger including a second turbine having an inlet and an outlet, and a second compressor having an inlet and an outlet, said second turbine inlet having a fixed geometry and being fluidly coupled with said second exhaust manifold, said second compressor inlet being fluidly coupled with said first compressor outlet.

2. The internal combustion engine of claim 1, including an exhaust gas re-circulation duct fluidly interconnecting at least one of said first exhaust manifold and said second exhaust manifold to said intake manifold.

3. The internal combustion engine of claim 2, including an exhaust gas re-circulation valve disposed in said exhaust gas re-circulation duct, said exhaust gas re-circulation valve having an inlet in fluid communication with said second exhaust manifold, a first outlet in fluid communication with said first turbine inlet, and a second outlet in fluid communication with said at least one intake manifold.

4. The internal combustion engine of claim 3, said first turbine inlet being fluidly coupled with said first exhaust manifold, and with said second turbine outlet.

5. The internal combustion engine of claim 1, said first turbine inlet being fluidly coupled with said first exhaust manifold, and with said second turbine outlet.

6. The internal combustion engine of claim 5, including an exhaust gas re-circulation duct fluidly interconnecting at least one of said first and said second exhaust manifolds with said intake manifold, and a valve and a cooler associated with said exhaust gas re-circulation duct.

7. The internal combustion engine of claim 5, including an aftercooler fluidly interconnecting said second compressor outlet and at least one said intake manifold.

8. The internal combustion engine of claim 7, including an intercooler fluidly interconnecting said first compressor outlet and said second compressor inlet.

9. A turbocharger system for use with an internal combustion engine having a plurality of combustion cylinders, an intake manifold and first and second exhaust manifolds, said turbocharger system comprising:
    a first turbocharger including a first turbine having at least one inlet and an outlet, and a first compressor having an inlet and an outlet, said at least one first turbine inlet having a controllable, variable intake nozzle and being fluidly coupled with the first exhaust manifold; and
    a second turbocharger including a second turbine having an inlet and an outlet, and a second compressor having an inlet and an outlet, said second turbine inlet being fluidly coupled with said second exhaust manifold, and said second compressor inlet being fluidly coupled with said first compressor outlet.

10. The turbocharger system of claim 9, including an exhaust gas re-circulation duct interconnecting at least one of said first exhaust manifold and said second exhaust manifold to said intake manifold.

11. The turbocharger system of claim 10 including an exhaust gas re-circulation valve disposed in said exhaust gas re-circulation duct, said exhaust gas re-circulation valve having an inlet in fluid communication with said second exhaust manifold, a first outlet in fluid communication with said first turbine at least one inlet, and a second outlet in fluid communication with said intake manifold.

12. The turbocharger system of claim 11, said first turbine at least one inlet being fluidly coupled with said first exhaust manifold, and with said second turbine outlet.

13. The turbocharger system of claim 9, said first turbine at least one inlet being fluidly coupled with said first exhaust manifold, and with said second turbine outlet.

14. The turbocharger system of claim 13, including an exhaust gas re-circulation duct fluidly interconnecting at least one of said first and said second exhaust manifolds with said intake manifold, and a valve and a cooler associated with said exhaust gas re-circulation duct.

15. The turbocharger system of claim 14, including an aftercooler fluidly interconnecting said second compressor outlet and said intake manifold.

16. The turbocharger system of claim 15, including an intercooler fluidly interconnecting said first compressor outlet and said second compressor inlet.

17. A method of operating an internal combustion engine, comprising the steps of:
    providing a plurality of combustion cylinders and an intake manifold supplying combustion gas to said plurality of combustion cylinders;
    transporting exhaust gas from said plurality of combustion cylinders to at least a first exhaust manifold and a second exhaust manifold;
    providing a first turbocharger including a first turbine having at least one first turbine inlet with a controllable variable intake nozzle and having an outlet, and a first compressor having an inlet and an outlet;
    providing a second turbocharger including a second turbine having an inlet and an outlet, and a second compressor having an inlet and an outlet;
    rotatably driving said first turbine with exhaust gas introduced at said at least one first turbine inlet from said first exhaust manifold;
    rotatably driving said second turbine with exhaust gas introduced at said second turbine inlet from said second exhaust manifold;
    introducing combustion gas at said first compressor inlet;
    transporting combustion gas from said first compressor outlet to said second compressor inlet;
    transporting combustion gas from said second compressor outlet to said intake manifold;
    sensing at least one of operating conditions of said engine and performance of said turbochargers; and
    controlling said controllable variable intake nozzle in response to at least one of said engine operating conditions and said performance of said turbochargers.

18. The method of claim 17, including providing a fluid conduit fluidly interconnecting said at least one first turbine inlet with said second turbine outlet, and transporting exhaust gas from said second turbine outlet to said at least one first turbine inlet.

19. The method of claim 17, including providing a re-circulation duct fluidly interconnecting at least one of said first and said second exhaust manifolds with said intake manifold, and recirculating exhaust gas from said at least one exhaust manifold to said intake manifold.

20. A turbocharger and engine emission control system for an internal combustion engine having a plurality of combustion cylinders, an intake manifold and first and second exhaust manifolds; comprising:
    a first turbocharger including a first turbine having an inlet and an outlet, and a first compressor having an inlet and an outlet, said first turbine inlet having a controllable variable intake nozzle and being fluidly coupled with the first exhaust manifold;
    a second turbocharger including a second turbine having a fixed inlet and an outlet, and a second compressor having an inlet and an outlet, said second turbine inlet fluidly coupled with said second exhaust manifold, said second compressor inlet fluidly coupled with said first compressor outlet, and said second compressor outlet fluidly coupled with the intake manifold; and
    an exhaust gas re-circulation duct fluidly coupled to said second exhaust manifold and said intake manifold.

21. The system of claim 20, including a valve in said exhaust gas re-circulation duct, said valve having an inlet fluidly coupled to said second exhaust manifold, a first outlet fluidly coupled to said first turbine inlet, and a second outlet fluidly coupled to said intake manifold.

22. The system of claim 20, including a fluid conduit interconnecting said second turbine outlet and said first turbine inlet.

* * * * *